United States Patent Office 3,159,656
Patented Dec. 1, 1964

3,159,656
16,17-BIS-OXIMINOESTRAEN-3-OLS AND ETHERS THEREOF
Max N. Huffman, Colorado Springs, Colo., assignor to Lasdon Foundation, Inc., Yonkers, N.Y., a corporation of Delaware
No Drawing. Filed Nov. 6, 1962, Ser. No. 235,830
11 Claims. (Cl. 260—397.5)

This invention relates to bis-oximino steroids and to the production thereof. More particularly, it relates to bis-oximino steroids of the following general formula

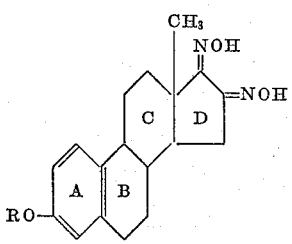

wherein R is a member of the group consisting of hydrogen, a loweralkyl radical, and a loweralkenyl radical and wherein ring B contains 2 or 3 double bonds.

The oximino radicals shown in the formula given above can exist in tautomeric nitroso form as illustrated below

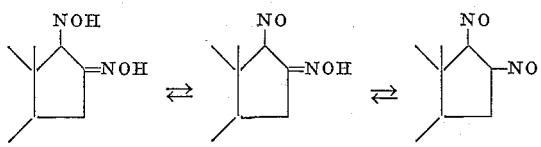

and it will be understood that this specification and claims cover both the oximino and nitroso forms even though only one form is illustrated by formula.

The oximino steroids which comprises the invention have useful physiological properties. They are active by oral administration in suppressing growth of the prostate glands of mammals. They also possess the property of suppressing to a most surprising degree pituitary gonadotrophin output of mammals. For instance, they are very active in suppressing pituitary gonadrotrophin output of the intact male and female rats when given orally. The compounds of the foregoing general formula wherein ring B contains two double bonds are most active in this respect; the compounds of the foregoing general formula wherein ring B contains three double bonds have less activity but with little or no estrus-producing activity.

It is an object of this invention to provide bis-oximino steroids of useful physiological properties. It is a further object to provide such bis-oximino steroids having an aromatic ring A and two or three double bonds in ring B. It is another object to provide such steroids having antiprostatic and pituitary gonadotrophin suppressing activity upon oral administration. These and other objects are apparent from and are achieved in accordance with the following disclosure.

The bis-oximino steroids which comprise this invention as illustrated by the foregoing structural formula can have a free hydroxyl group in the 3-position in which case R represents hydrogen. R can also represent loweralkyl radicals such as methyl, ethyl, propyl, isopropyl, n-butyl, isobutyl, n-amyl and isoamyl. R can also represent loweralkenyl radicals such as vinyl, allyl, crotyl and methallyl radicals.

The bis-oximino steroids which comprise this invention can be produced from 17-keto steroids of the general formula

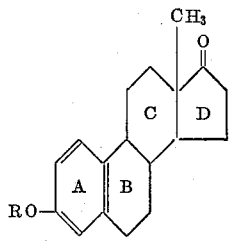

wherein R represents hydrogen, a loweralkyl radical, or a loweralkenyl radical and the ring B contains 2 to 3 double bonds, inclusive, by reaction with alkyl nitrite and an alkali metal salt of a tertiary alcohol according to the procedure disclosed in the Huffman Patent No. 2,584,271, February 5, 1952. Preferred reagents are isoamyl nitrite and potassium tertiary butoxide. The reaction is usually conducted at relatively low temperature (10–40° C.) and after the reaction is complete, the excess of reagents is destroyed by addition of an aliphatic ketone such as acetone or butanone. The mixture can be then diluted with water and the 16-oximino-17-keto steroid precipitated. The latter can be recovered by filtration or similar operation and, if desired, purified by recrystallization. The 16-oximino-17-keto steroid is then treated with hydroxylamine or a water-soluble salt thereof, preferably in the presence of a buffering agent such as sodium acetate and usually at a temperature in the range of 50–150° C. The hydroxylamine combines with the keto group in the 17-position and forms a 17-oximino substituent. The 16,17-bis-oximino steroids thus produced can be separated from the reaction mixture by dilution with water which causes precipitation of the bis-oximino steroid, followed by filtration or similar isolation procedure. The product can be purified by recrystallization from an aqueous lower alcohol.

The steroid alkenyl ethers which are starting materials for certain of the compounds of this invention can be produced by the methods disclosed in the Huffman Patent No. 3,002,009, September 26, 1961 by reacting a 3-hydroxy steroid having an aromatic ring A with an alkenyl halide, such as allyl bromide, methallyl bromide or crotyl bromide, in the presence of anhydrous potassium carbonate in a lower alcohol solvent.

The invention is disclosed in further detail by means of the following examples which are provided merely for the purpose of illustrating the invention. It will be understood by those skilled in the art that numerous modifications in equivalent materials and in operating conditions can be made without departing from the invention as disclosed herein.

EXAMPLE 1

*16,17-Bis-Oximinoestra-1,3,5(10),7-Tetraen-3-Ol*

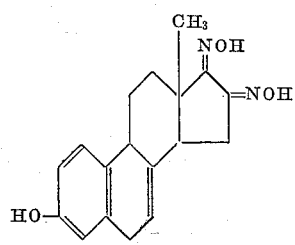

1.0 gram of equilin was stirred for one hour in 46 ml. of a solution of potassium tert-butoxide in t-butyl alcohol (4.4 g. of potassium in 180 ml. of anhydrous t-butyl alcohol) containing 0.89 ml. of isoamyl nitrite. Then 0.90 ml. of 2-butanone was added and the mixture stirred for 15 minutes. The mixture was diluted with 2 liters of water and acidified with dilute sulfuric acid. The precipitate 16-oximinoestra-1,3,5(10),7-tetraen-3-ol-17-one was removed by filtration and washed well with water. After recrystallization from aqueous methanol it had M.P. 205.5–206° C. (with decomposition).

A solution of 658 mg. of 16-oximinoestra-1,3,5(10),7-tetraen-3-ol-17-one in 65 ml. of 95% ethanol was heated to reflux for one hour with 1300 mg. of hydroxylamine hydrochloride, 2600 mg. of sodium acetate trihydrate and 13 ml. of water. Then 260 ml. of water was added and the solution evaporated until ebullition ceased and cooled to room temperature. The precipitate of 16,17-bis-oximinoestra-1,3,5(10),7-tetraen-3-ol which formed was removed by filtration and washed well with water; yield 572 mg.; M.P. 212–213° C. (with decomposition). After recrystallization from aqueous methanol it had M.P. 219–220° C.

EXAMPLE 2

*3-Methoxy-16,17-Bis-Oximinoestra-1,3,5(10),7-Tetraene*

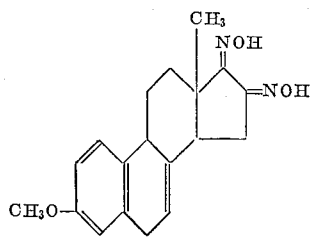

1.03 gram of equilin methyl ether was stirred for one hour in 46 ml. of a solution of potassium tert-butoxide in t-butyl alcohol (4.4 g. of potassium dissolved in 180 ml. of anhydrous t-butyl alcohol) containing 0.75 ml. of isoamyl nitrite. Then 0.78 ml. of 2-butanone was added and the mixture stirred for 15 minutes and poured into 200 ml. of ice water. The resulting mixture was acidified with dilute sulfuric acid and the precipitate of 3-methoxy-16-oximinoestra-1,3,5(10),7-tetraen-17-one was collected on a filter and washed thoroughly with water.

The 3-methoxy-16-oximinoestra-1,3,5(10),7-tetraen-17-one was dissolved in 100 ml. of 95% ethanol and mixed with a solution of 2.0 g. of hydroxylamine hydrochloride and 4.0 g. of sodium acetate trihydrate in 20 ml. of water. The resulting solution was refluxed for one hour, then diluted with 200 ml. of water, and chilled in a refrigerator. The precipitate of 3-methoxy-16,17-bis-oximinoestra-1,3,5(10),7-tetraene was collected on a filter, washed well with water and dried; M.P. 203–204° C. (with decomposition). After recrystallization from dilute methanol the product melted at 204–205° C. (with decomposition).

EXAMPLE 3

*3-Allyloxy-16,17-Bis-Oximinoestra-1,3,5(10),7-Tetraene*

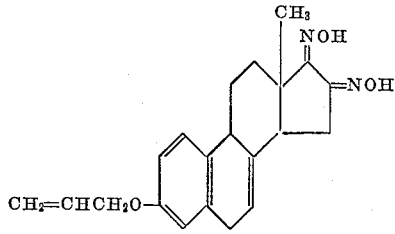

To a solution of 500 mg. of equilin in 50 ml. of 90% methanol was added 5.0 g. of anhydrous potassium carbonate followed by 0.56 ml. of allyl bromide. The mixture was stirred and heated to reflux for one hour. Then a solution of 1.2 g. of potassium hydroxide in 12.5 ml. of water was added and the solution evaporated until crystallization occurred. The mixture was cooled and refrigerated. The precipitate of equilin allyl ether which formed was collected on a filter and washed with 30% methanol and water. It was dissolved in 50 ml. of methanol and 30 ml. of 0.1 N sodium hydroxide solution was added. The resulting solution was cooled and refrigerated for 15 hours. The equilin allyl ether which precipitated was separated by filtration, washed with 30% methanol and water and dried; yield 340 mg.; M.P. 114–115° C.

The equilin allyl ether was dissolved in 17 ml. of a solution of potassium tert-butoxide in t-butyl alcohol (4.4 g. of potassium dissolved in 180 ml. of anhydrous t-butyl alcohol) and 0.28 ml. of isoamyl nitrite was added. The solution was stirred at room temperature for one hour, then 0.29 ml. of 2-butanone was added and stirring continued for 15 minutes. The solution was diluted with 72 ml. of ice water and acidified with dilute sulfuric acid. 3-allyloxy - 16 - oximinoestra-1,3,5(10),7-tetraen-17-one precipitated and was removed by filtration and washed well with water.

The 3-allyloxy-16-oximinoestra-1,3,5(10),7-tetraen-17-one was dissolved in 34 ml. of ethanol and mixed with a solution of 680 mg. of hydroxylamine hydrochloride and 1.36 g. of sodium acetate trihydrate in 6.6 ml. of water. The resulting solution was refluxed for one hour, diluted with 195 ml. of water and then cooled to room temperature. A precipitate of 3-allyloxy-16,17-bis-oximinoestra-1,3,5(10),7-tetraene formed; it was removed by filtration, recrystallized from aqueous methanol and dried; yield 224 mg.; M.P. 193–194° C. Further recrystallization from aqueous methanol gave M.P. 205.5–206° C. (with decomposition).

EXAMPLE 4

*16,17-Bis-Oximinoestra-1,3,5(10),6,8-Pentaen-3-Ol*

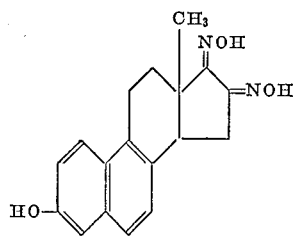

To a solution of 500 mg. of equilenin in 23 ml. of a solution of potassium tert-butoxide in t-butyl alcohol (4.4 g. of potassium dissolved in 180 ml. of anhydrous t-butyl alcohol) was added 0.38 ml. of isoamyl nitrite with good stirring. The reaction mixture was stirred for one hour longer, then 0.39 ml. of 2-butanone was added and stirring was continued for one-half hour. The reaction mixture was poured into 100 ml. of ice water and acidified with dilute sulfuric acid. The precipitate of 16-oximinoequilenin which formed while the mixture was refrigerated overnight was removed by filtration, washed well with water and dried.

A solution containing 232 mg. of 16-oximinoequilenin, 460 mg. of hydroxylamine hydrochloride and 920 mg. of sodium acetate trihydrate in 23 ml. of 95% ethanol and 5 ml. of water was refluxed for one hour, then diluted with 92 ml. of water, evaporated until ebullition ceased and cooled to room temperature. The precipitate of 16,17 - bis - oximinoestra - 1,3,5(10),6,8 - pentaen - 3 - ol which formed was separated, washed well with water and dried; yield 239 mg.; M.P. 230–232° C. (with decomposition). Recrystallization from aqueous methanol gave M.P. 231–232° C. (with decomposition).

EXAMPLE 5

*3-Methoxy-16,17-Bis-Oximinoestra-1,3, 5(10),6,8-Pentaene*

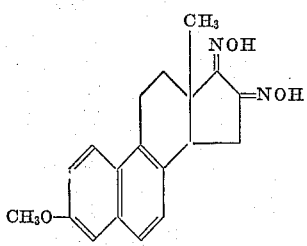

To a solution of 84 mg. of equilenin in 84 ml. of 90% methanol was added 0.84 g. of anhydrous potassium carbonate. The solution was heated to reflux, 0.4 ml. of dimethyl sulfate was added, and it was stirred and refluxed for 30 minutes. Then 0.4 ml. of dimethyl sulfate was added and stirring and refluxing continued for 30 minutes longer. Finally 17 ml. of water was added and the solution cooled and refrigerated for 15 hours. The precipitate of equilenin methyl ether was removed, washed well with water and dried; yield 98 mg.; M.P. 193–194° C.

The equilenin methyl ether was stirred for one hour in 25 ml. of a solution of potassium tert-butoxide in t-butyl alcohol (4.4 g. of potassium dissolved in 180 ml. of anhydrous t-butyl alcohol) containing 0.075 ml. of isoamyl nitrite. Then 0.078 ml. of 2-butanone was added and the solution stirred for 15 minutes. The solution was poured into 200 ml. of ice water, acidified with dilute sulfuric acid, and extracted with 300 ml. of ether. The ether extract was washed twice with 200-ml. portions of water and evaporated to dryness.

The residue of 3-methoxy-16-oximinoestra-1,3,5(10), 6,8-pentaen-17-one so obtained was dissolved in 10 ml. of 95% ethanol and 200 mg. of hydroxylamine hydrochloride, 400 mg. of sodium acetate trihydrate and 2 ml. of water were added. The resulting solution was refluxed for one hour, then diluted with 50 ml. of water and cooled to room temperature. The 3-methoxy-16,17-oximinoestra-1,3,5(10),6,8-pentaene which precipitated was separated by filtration and washed well with water; M.P. 199–200° C. (with decomposition). Recrystallization from equeous methanol gave M.P. 208° C. (with decomposition).

EXAMPLE 6

*3-Allyloxy-16,17-Bis-Oximinoestra-1,3,5(10), 6,8-Pentaene*

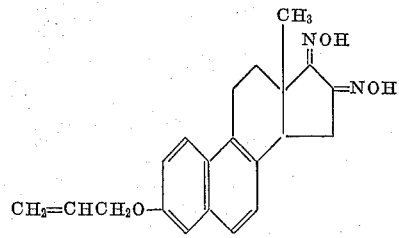

To a solution of 775 mg. of equilenin allyl ether in 31 ml. of a solution of potassium tert-butoxide in t-butyl alcohol (4.4 g. of potassium in 180 ml. of anhydrous t-butyl alcohol) was added 0.48 ml. of isoamyl nitrite. The mixture was stirred at room temperature for one hour, then treated with 0.35 ml. of 2-butanone and stirred for ¼ hour longer. The reaction mixture was diluted with 160 ml. of ice water and acidified with dilute sulfuric acid. Upon refrigeration a precipitate of 3-allyloxy-16-oximinoestra-1,3,5(10),6,8-pentaen-17-one was formed. This was removed by filtration, washed and dried.

A solution of 442 mg. of 3-allyloxy-16-oximinoestra-1,3,5(10),6,8-pentaen-17-one, 442 mg. of hydroxylamine hydrochloride and 884 mg. of sodium acetate trihydrate in 45 ml. of 95% ethanol and 9 ml. of water was heated to reflux for one hour. Then 180 ml. of water was added and the solution was evaporated until ebullition ceased and cooled to room temperature. A precipitate of 3-allyloxy - 16,17 - bis - oximinoestra - 1,3,5(10),6,8 - pentaene formed; it was removed by filtration, washed well with water and dried; yield 446 mg.; M.P. 211° C. (with decomposition). Recrystallization from aqueous methanol gave M.P. 213° C.

I claim:

1. A steroid selected from the group consisting of steroids of the formulas

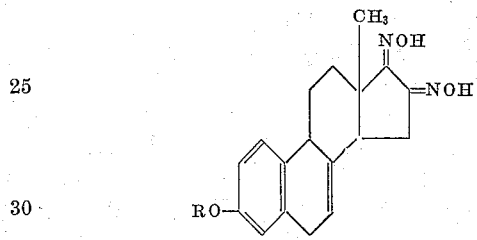

and

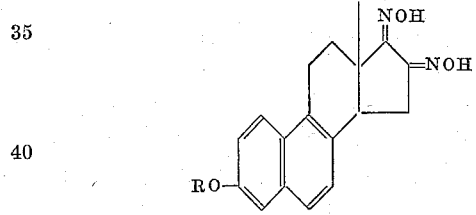

wherein R is a member of the group consisting of hydrogen, lower alkyl and lower alkenyl.

2. 16,17 - bis - oximinoestra - 1,3,5(10),7 - tetraen-3-ol.

3. A lower alkyl ether of 16,17-bis-oximinoestra-1,3,5(10),7-tetraen-3-ol.

4. A lower alkenyl ether of 16,17-bis-oximinoestra-1,3,5(10),7-tetraen-3-ol.

5. 3 - methoxy - 16,17 - bis - oximinoestra - 1,3,5(10), 7-tetraene.

6. 3 - allyloxy - 16,17 - bis - oximinoestra - 1,3,5(10), 7-tetraene.

7. 16,17 - bis - oximinoestra - 1,3,5(10),6,8 - pentaen-3-ol.

8. A lower alkyl ether of 16,17-bis-oximinoestra-1,3, 5(10),6,8-pentaen-3-ol.

9. A lower alkenyl ether of 16,17-bis-oximinoestra-1,3, 5(10),6,8-pentaen-3-ol.

10. 3 - methoxy - 16,17 - bis - oximinoestra - 1,3,5(10), 6,8-pentaene.

11. 3 - allyloxy - 16,17 - bis - oximinoestra - 1,3,5(10), 6,8-pentaene.

No references cited.